United States Patent Office 2,853,488
Patented Sept. 23, 1958

2,853,488

1,4-BIS(2-BENZOTHIAZOLYLTHIOMETHYL)-2,5-DIMETHYLPIPERAZINES

John J. D'Amico, Charleston, and Marion W. Harman, Nitro, W. Va., assignors to Monsanto Chemical Company, St. Louis, Mo., a corporation of Delaware No Drawing. Application May 27, 1955
Serial No. 511,748

4 Claims. (Cl. 260—268)

The present invention relates to new vulcanization accelerators, to a process of vulcanizing rubber and to the vulcanized rubber products obtained with the aid of said new accelerators.

The accelerators of this invention may be represented by the general structural formula

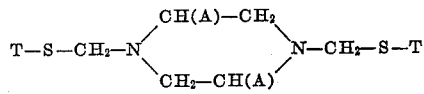

where A represents lower alkyl groups and T represents a thiazolyl radical, as for example 2-benzothiazolyl, 4-phenyl benzothiazolyl, 6-nitrobenzothiazolyl, 6-ethoxy benzothiazolyl and 5-chloro-2-benzothiazolyl radicals. While the aforementioned radicals are illustrative of some of the thiazolyl radicals which may be employed, the invention is by no means limited thereto. It has been discovered that the presence of lower alkyl groups in the piperazine ring markedly improves the accelerating properties.

The new accelerators may be prepared by condensing a mercaptothiazole with formaldehyde or a polymer thereof and with an alkyl piperazine. Methods heretofore described for condensing primary and secondary amines with formaldehyde and mercaptothiazoles are generally applicable. As an illustration of a satisfactory procedure, 40.6 grams (0.5 mole) of 36% by weight formaldehyde was added dropwise with stirring to 28.6 grams (0.25 mole) of 2,5-dimethyl piperazine dissolved in 100 ml. of water, the mixture being kept cool during the addition. Then 86 grams (0.5 mole) of 97% mercaptobenzothiazole in 600 grams of acetone was added all at once, the cooling means removed and the mixture stirred for an hour. The white precipitate which formed was filtered, washed with a small amount of acetone and dried in a 50° C. oven. The yield of 1,4-bis(2-benzothiazolylthiomethyl)-2,5-dimethylpiperazine was 93.9% of theory and the product melted at 169–171° C. Analysis gave 12.02% nitrogen and 27.23% sulphur as compared to 11.85% nitrogen and 27.13% sulfur calculated for $C_{22}H_{24}N_4S_4$.

Employing substantially the same reaction conditions and replacing the mercaptobenzothiazole with an equimolar amount, respectively, of 6-ethoxy mercaptobenzothiazole and 5-chloromercaptobenzothiazole, further examples of the products of this invention were prepared possessing the following physical properties:

1,4 - bis(6 - ethoxybenzothiazolylthiomethyl) - 2,5 - dimethylpiperazine, a tan solid, M. P. 165–167° C. in 84.3% theory yield. Analysis gave 9.72% nitrogen and 22.85% sulfur compared to 9.99% nitrogen and 22.87% sulfur calculated for $C_{26}H_{32}N_4O_2S_4$.

1,4 - bis(5 - chloro - 2 - benzothiazolylthiomethyl) - 2,5-dimethylpiperazine, in 98.3% theory yield, M. P. 153–154° C. with decomposition. Analysis gave 9.98% nitrogen, 23.47% sulfur and 12.93% chlorine as compared to 10.35% nitrogen, 23.68% sulfur and 13.09% chlorine calculated for $C_{22}H_{22}Cl_2N_4S_4$.

As a specific example of the method of this invention, accelerators of the class herein defined were incorporated in the following rubber composition:

| Stock | A | B | C |
|---|---|---|---|
| | Parts by weight | | |
| Smoked sheets | 100 | 100 | 100 |
| Carbon black | 50 | 50 | 50 |
| Zinc oxide | 5 | 5 | 5 |
| Stearic acid | 3 | 3 | 3 |
| Saturated hydrocarbon softener | 3 | 3 | 3 |
| Sulfur | 2.5 | 2.5 | 2.5 |
| 1,4 - Bis(2-benzothiazolylthiomethyl)-2,5 - dimethylpiperazine | 0.8 | | |
| 1,4 - Bis(6-ethoxybenzothiazolylthiomethyl)-2,5 - dimethylpiperazine | | 0.8 | |
| 1,4 - Bis(5-chloro-2-benzothiazolylthiomethyl)-2,5-dimethylpiperazine | | | 0.8 |

After vulcanization in a press for 45 minutes at 144° C., the compositions had the physical properties as shown in Table I.

Table I

| Stock | Modulus of Elasticity in lbs./in.² at Elongation of 300% | Tensile at Break in lbs./in.² | Ultimate Elongation, Percent |
|---|---|---|---|
| A | 2,813 | 3,496 | 366 |
| B | 2,610 | 3,600 | 413 |
| C | 2,736 | 3,400 | 380 |

On the other hand 1.5 parts of 1,4-bis(2-benzothiazolylthiomethyl)-piperazine in a base stock comprising pale crepe 100, whiting 60, zinc oxide 5, sulfur 2, zinc stearate 0.25 had only 210 p. s. i. modulus and 1620 p. s. i. tensile after curing in a press 45 minutes at a temperature of 20 pounds' steam pressure.

It is intended to cover all changes and modifications of the examples of the invention herein chosen for purposes of disclosure which do not constitute departures from the spirit and scope of the invention.

What is claimed is:

1. A compound of the structure

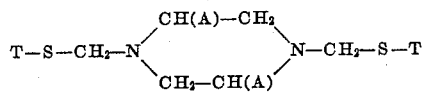

where A represents lower alkyl groups and T represents a benzothiazolyl radical containing less than 14 carbon atoms selected from the group consisting of unsubstituted benzothiazolyl and 4-phenyl, 6-nitro, 6-lower alkoxy and 5-chloro substituted benzothiazolyl radicals.

2. 1,4-bis(2-benzothiazolylthiomethyl) - 2,5 - dimethylpiperazine.

3. 1,4-bis(6-ethoxy benzothiazolylthiomethyl) - 2,5 - dimethylpiperazine.

4. 1,4 - bis(5 - chloro - 2 - benzothiazolylthiomethyl)-2,5-dimethylpiperazine.

References Cited in the file of this patent

UNITED STATES PATENTS

| 1,931,396 | Sibley | Oct. 17, 1933 |
| 1,972,918 | Mills et al. | Sept. 11, 1934 |
| 2,508,652 | Ross et al. | May 23, 1950 |
| 2,560,032 | Smith | July 10, 1951 |
| 2,709,169 | Morren | May 24, 1955 |

OTHER REFERENCES

Chemical Abstracts, vol. 46, page 6641e (1952).